N. H. FAY.

Assignor, by mesne assignments, to the SHOE-MACHINE MANUFACTURING CO.

Sand-Paper Holders.

No. 8,458. Reissued Oct. 22, 1878.

WITNESSES.
Samuel D. Kelley.
J. W. Porter

INVENTOR.
Norman H. Fay
By Eugene Humphrey
his Attorney.

N. PETERS, PHOTO-LITHOGRAPHER, WASHINGTON, D. C.

UNITED STATES PATENT OFFICE.

NORMAN H. FAY, OF ABBOT, ME., ASSIGNOR, BY MESNE ASSIGNMENTS, TO THE SHOE MACHINE MANUFACTURING COMPANY, OF BOSTON, MASS.

IMPROVEMENT IN SAND-PAPER HOLDERS.

Specification forming part of Letters Patent No. 124,259, dated March 5, 1872; Reissue No. 8,458, dated October 22, 1878; application filed August 26, 1878.

*To all whom it may concern:*

Be it known that I, NORMAN H. FAY, of Abbot, in the county of Piscataquis and State of Maine, have invented a new and useful Sand-Paper or Emery-Cloth Holder, it being for the purpose of enabling sand or emery paper or cloth to be used to advantage by an artisan; and I do hereby declare the same to be fully described in the following specification and represented in the accompanying drawing, of which—

Figure 1:
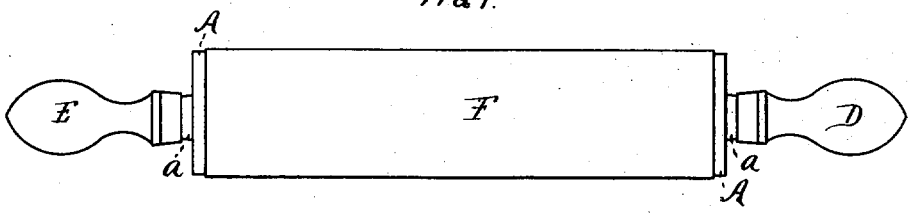
Figure 2:
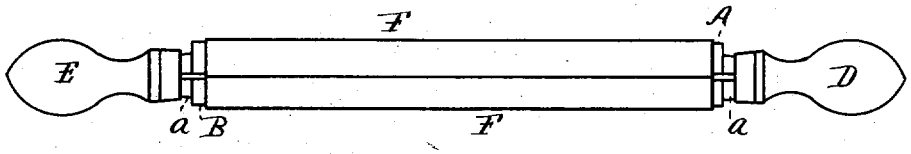
Figure 3:
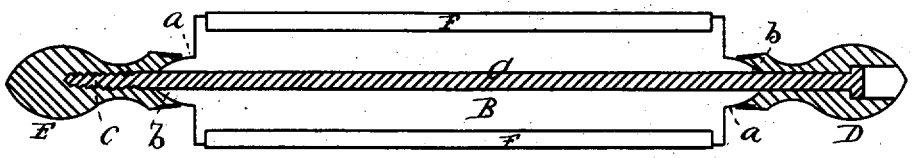
Figure 4:
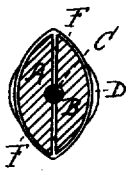

Figure 1 is a top view, Fig. 2 an edge view, Fig. 3 a longitudinal section, and Fig. 4 a transverse section, of the article with two pieces or strips of sand or emery paper or cloth applied to it.

It is also very useful for holding blotting-paper or buff-leather for many purposes for which such may be employed in the arts.

In lieu of the usual cloth, leather, or metallic hinges heretofore employed on one side, and the dowel pins or screws used on the opposite side, to unite a pair of jaws or half-rolls, I introduce a central shaft or rod, and adapt the jaws or half-rolls to fit the same, and securely unite them by their ends with fastenings supported on said shaft. The jaws being thus fitted to the shaft are, when fastened together around the same, thereby prevented from sliding laterally upon each other, and the end fastenings also serve to keep the jaws from sliding longitudinally upon each other and the shaft, and thus becoming relatively displaced in that direction.

In the drawings, A B represent a divided roll or two long jaws, each having a section corresponding to the segment of a circle or ellipse. From each of the opposite ends of such jaws a semi-conic frustum, *a*, is extended. Furthermore, each jaw on its inner face is grooved lengthwise to receive a long rod, C, projecting from a handle, D, which at its inner end is concave, as shown at *b*, to fit to two of the semi-conic frustums or projections of the jaws. Another handle, E, similarly made, screws upon the rod C, the said rod being provided with a screw, *c*, to enter and screw into the handle. The handle is recessed at its inner end, as is the handle D.

If sand-paper, arranged to extend across the outer or curved surfaces of the jaws, be extended between them, and the screw-handle E be screwed up, the jaws will be forced toward each other upon the sand-paper, and will hold it confined to them by means of fastenings *b b*, which encircle the end projections on the respective halves of such divided roll, and by their action thereon draw the same toward the supporting-shaft.

The pieces of sand-paper are shown at F F.

The handles enable a person with both hands hold of them to readily use the implement for sandpapering or smoothing an article; and when the roll is made circular, as suggested, the said implement is particularly useful to joiners, cabinet-makers, silversmiths, or persons in various mechanical trades.

I claim—

1. A sand-paper holder or buffing-roll divided longitudinally and formed or provided with end projections, and fitted to a central shaft provided with suitable fastenings threaded or arranged thereon to clamp the divisions or jaws of such roll together, substantially as described, and for the purposes specified.

2. In combination, jaws A B, having semi-conical projections *a a*, a central shaft, C, and handles or fastenings D E, concaved, as at *b b*, and arranged to operate upon said semi-conical projections, all substantially as and for the purposes specified.

NORMAN H. FAY.

Witnesses:
JOHN F. SPRAGUE,
D. H. BUXTON.